United States Patent
Wang

(10) Patent No.: US 11,836,956 B2
(45) Date of Patent: Dec. 5, 2023

(54) CONTROL METHOD FOR ELECTRONIC DEVICE, ELECTRONIC DEVICE AND COMPUTER READABLE STORAGE MEDIUM

(71) Applicant: GUANGDONG OPPO MOBILE TELECOMMUNICATIONS CORP., LTD., Guangdong (CN)

(72) Inventor: Lu Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/532,448

(22) Filed: Nov. 22, 2021

(65) Prior Publication Data

US 2022/0148214 A1  May 12, 2022

Related U.S. Application Data

(63) Continuation of application No. PCT/CN2019/089615, filed on May 31, 2019.

(51) Int. Cl.
*G06V 40/18* (2022.01)
*G06V 10/143* (2022.01)
(Continued)

(52) U.S. Cl.
CPC ............ *G06V 10/143* (2022.01); *G06T 7/13* (2017.01); *G06T 7/70* (2017.01); *G06V 10/145* (2022.01);
(Continued)

(58) Field of Classification Search
CPC ...... G06V 40/197; G06V 40/19; G06V 40/18; G06V 40/193; G06V 10/145
See application file for complete search history.

(56) References Cited

U.S. PATENT DOCUMENTS

| 9,632,312 B1 | 4/2017 | Cakmakci et al. |
| 2012/0120375 A1* | 5/2012 | Kilcher ............... G01S 7/4814 353/121 |

(Continued)

FOREIGN PATENT DOCUMENTS

| CN | 104573667 A | 4/2015 |
| CN | 108600740 A | 9/2018 |

(Continued)

OTHER PUBLICATIONS

A. Betzold, G. M. Morris, and T. R. M. Sales, "Efficient Structured Light Generator," in Frontiers in Optics 2016, OSA Technical Digest (online) (Optica Publishing Group, 2016), paper FTu5A.4. (Year: 2016).*

(Continued)

*Primary Examiner* — Michael Robert Cammarata
(74) *Attorney, Agent, or Firm* — Young Basile Hanlon & MacFarlane, P.C.

(57) ABSTRACT

A control method for an electronic device and an electronic device are provided. The electronic device includes an infrared emitter, an infrared sensor, and a visible light sensor. The control method includes: acquiring an original pixel position of a zero-level region on the infrared sensor; acquiring a human eye pixel position of a human eye region on the visible light sensor; determining whether a human eye enters the zero-level region according to the original pixel position and the human eye pixel position; and triggering a protection mechanism of the infrared emitter when the human eye enters the zero-level region.

18 Claims, 13 Drawing Sheets

(51) Int. Cl.
  *G06T 7/13* (2017.01)
  *G06T 7/70* (2017.01)
  *H04N 23/56* (2023.01)
  *H04N 23/74* (2023.01)
  *G06V 10/75* (2022.01)
  *G06V 10/44* (2022.01)
  *G06V 10/145* (2022.01)
  *G06V 40/16* (2022.01)

(52) U.S. Cl.
  CPC ............ *G06V 10/44* (2022.01); *G06V 10/751* (2022.01); *G06V 40/161* (2022.01); *G06V 40/18* (2022.01); *G06V 40/197* (2022.01); *H04N 23/56* (2023.01); *H04N 23/74* (2023.01); *G06T 2207/10048* (2013.01)

(56) References Cited

U.S. PATENT DOCUMENTS

| | | | |
|---|---|---|---|
| 2017/0017842 A1* | 1/2017 | Ma | G06V 40/193 |
| 2017/0061210 A1* | 3/2017 | Ollila | H04N 1/00307 |
| 2018/0032813 A1* | 2/2018 | Lee | H04N 5/33 |
| 2019/0306441 A1* | 10/2019 | Chang | H04N 13/243 |
| 2020/0082520 A1* | 3/2020 | Tang | G06T 7/0004 |
| 2021/0142040 A1* | 5/2021 | Lin | G06V 40/18 |

FOREIGN PATENT DOCUMENTS

| | | | | |
|---|---|---|---|---|
| CN | 108700917 A | | 10/2018 | |
| CN | 108716982 A | | 10/2018 | |
| CN | 108716983 A | * | 10/2018 | ............ G01M 11/00 |
| CN | 108716983 A | | 10/2018 | |
| CN | 109194869 A | | 1/2019 | |
| CN | 109753925 A | | 5/2019 | |
| CN | 109784246 A | | 5/2019 | |
| JP | 2006346106 A | * | 12/2006 | |
| WO | WO-2023010245 A1 | * | 2/2023 | |

OTHER PUBLICATIONS

Yew Fatt Ng et al, "A Review of Iris Recognition Algorithms", 2008 International Symposium on Information Technology, IEEE, Aug. 26-28, 2008. (7 pages).

Extended European Search Report for EP Application 19931080.6 dated May 17, 2022. (11 pages).

International Search Report with English Translation for PCT/CN2019/089615 dated Mar. 3, 2020.

Chinese Office Action with English Translation for CN Application 201980095503.2 dated May 30, 2023. (20 pages).

* cited by examiner

CONTROL METHOD FOR ELECTRONIC DEVICE, ELECTRONIC DEVICE AND COMPUTER READABLE STORAGE MEDIUM

CROSS-REFERENCE TO RELATED APPLICATION(S)

This application is a continuation of the International Patent Application No. PCT/CN2019/089615, filed May 31, 2019, the entire content of which is incorporated herein by reference.

TECHNICAL FIELD

The present disclosure relates to a field of consumer electronic products, and more particularly to a control method for an electronic device, an electronic device and a computer-readable storage medium.

BACKGROUND

With the development of electronic technology, electronic devices, such as a smart phone and a tablet computer, have become more and more popular. A structured light projector and a structured light camera can be installed on the electronic device. The structured light projector is used to project a laser pattern into a target space, and the structured light camera is used to collect the laser pattern to obtain depth information.

SUMMARY

The present disclosure provides in embodiments a control method for an electronic device, an electronic device and a computer-readable storage medium.

In embodiments of the present disclosure, a control method for an electronic device is provided. The electronic device includes an infrared emitter, an infrared sensor, and a visible light sensor. The control method includes: acquiring an original pixel position of a zero-level region on the infrared sensor; acquiring a human eye pixel position of a human eye region on the visible light sensor; determining whether a human eye enters the zero-level region according to the original pixel position and the human eye pixel position; and triggering a protection mechanism of the infrared emitter when the human eye enters the zero-level region.

In embodiments of the present disclosure, an electronic device is provided. The electronic device includes an infrared emitter, an infrared sensor, a visible light sensor, and a processor. The processor is configured to: acquire an original pixel position of a zero-level region on the infrared sensor; acquire a human eye pixel position of a human eye region on the visible light sensor; determine whether a human eye enters the zero-level region according to the original pixel position and the human eye pixel position; and trigger a protection mechanism of the infrared emitter when the human eye enters the zero-level region.

In embodiments of the present disclosure, provided is a non-transitory computer-readable storage medium containing computer-readable instructions that, when executed by a processor, causes the processor to perform the control method as described in the above embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily appreciated from the following descriptions made with reference to the drawings, in which.

DETAILED DESCRIPTION

Figure 1:
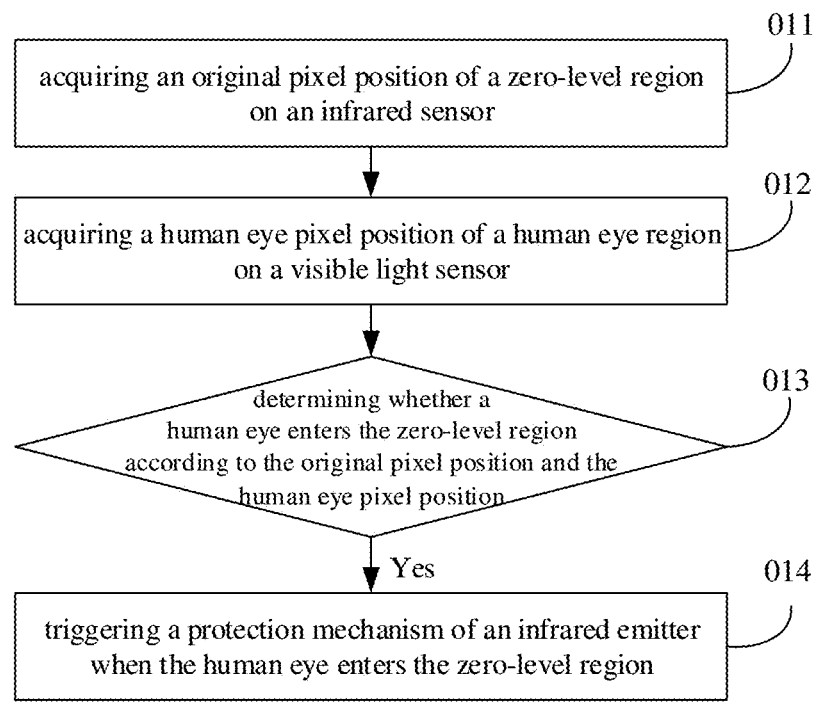
FIG. 1 a flowchart of a control method for an electronic device according to some embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Figure 2:
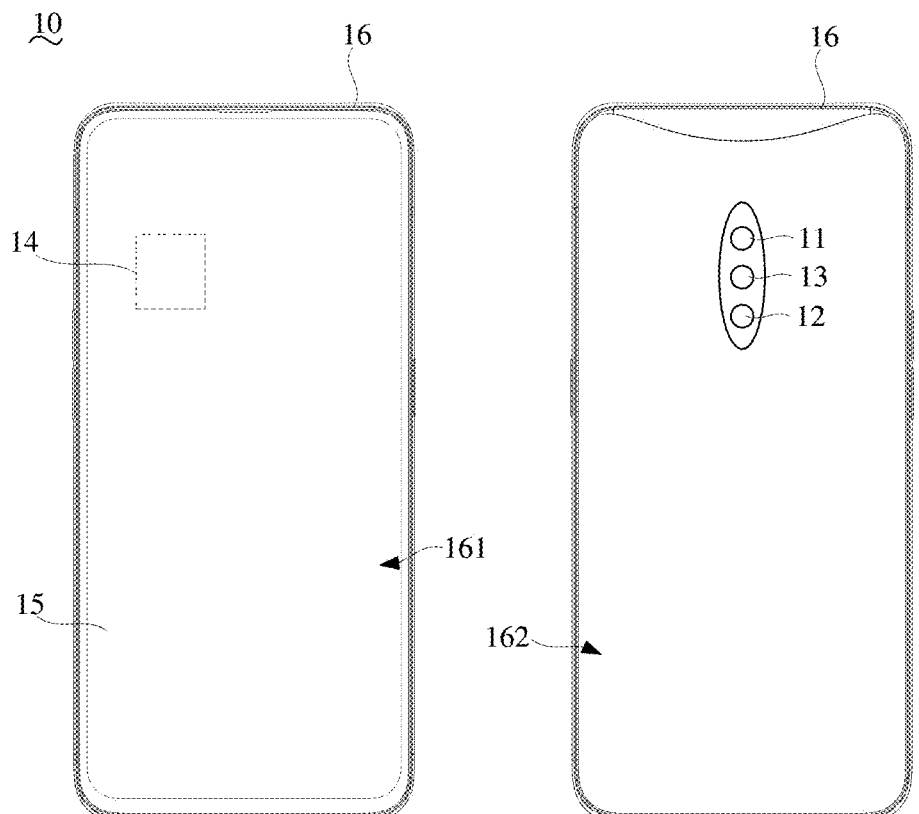
FIG. 2 is a schematic diagram of an electronic device according to some embodiments of the present disclosure.
Figure 3:
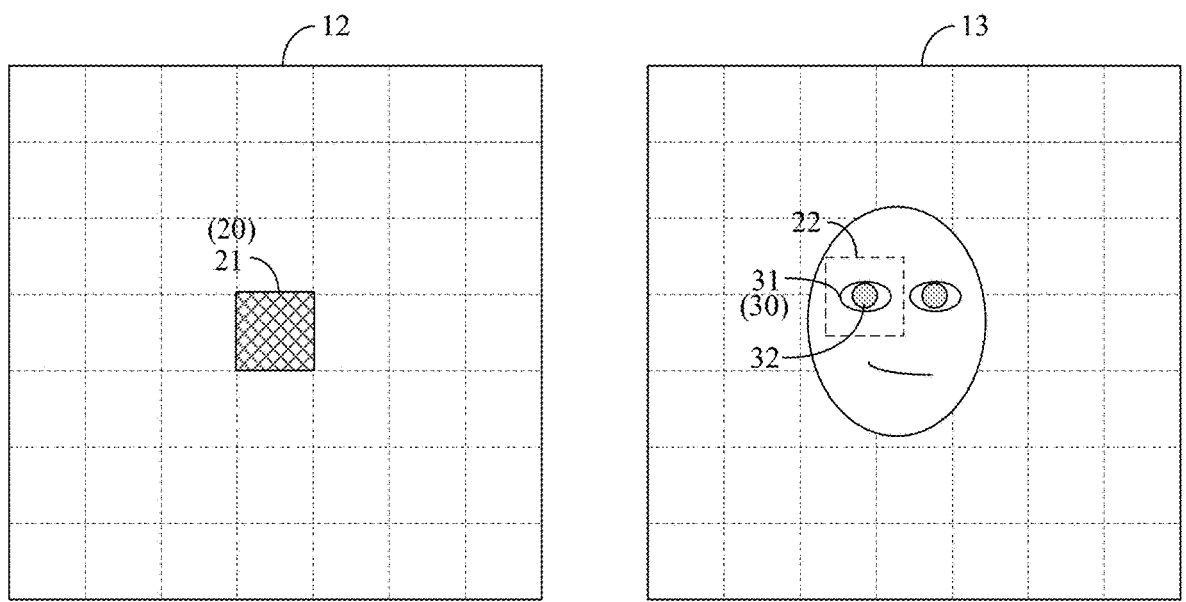
FIG. 3 is a schematic diagram showing an application scene for a control method for an electronic device according to some embodiments of the present disclosure.

With reference to FIGS. 1 to 3, in embodiments of the present disclosure, a control method for an electronic device 10 is provided. The electronic device 10 includes an infrared emitter 11, an infrared sensor 12, and a visible light sensor 13. The control method includes: in block 011, acquiring an original pixel position 21 of a zero-level region 20 on the infrared sensor 12; in block 012, acquiring a human eye pixel position 31 of a human eye region 30 on the visible light sensor 13; in block 013, determining whether a human eye enters the zero-level region 20 according to the original pixel position 21 and the human eye pixel position 31; and in block 014, triggering a protection mechanism of the infrared emitter 11 when the human eye enters the zero-level region 20.

As shown in FIG. 2, in embodiments of the present disclosure, an electronic device 10 is provided. The electronic device 10 includes an infrared emitter 11, an infrared sensor 12, a visible light sensor 13, and a processor 14. The control method of the electronic device 10 of the embodiments of the present disclosure can be implemented by the electronic device 10 of the embodiments of the present disclosure. For example, the processor 14 may be used to perform the process as described in blocks 011, 012, 013, and 014.

In other words, the processor 14 is configured to: acquire an original pixel position 21 of a zero-level region 20 on the infrared sensor 12; acquire a human eye pixel position 31 of a human eye region 30 on the visible light sensor 13; determine whether a human eye enters the zero-level region 20 according to the original pixel position 21 and the human eye pixel position 31; and trigger a protection mechanism of the infrared emitter 11 when the human eye enters the zero-level region 20.

It can be understood that with the development of electronic technology, more and more mobile phones are equipped with 3D structured light. The 3D structured light is normally used for front face unlocking and background blurring. In an application of the 3D structured light, a laser source is used to project speckles of a fixed pattern on an object, and an infrared camera with a specific transmission band is used to shoot the speckles at the same time. Depth and distance information of the object is determined according to position information of each speckle.

The laser source is composed of a vertical cavity surface emitting laser (VCSEL), a collimating lens and diffractive optical elements (DOEs). A laser beam emitted by the VCSEL has a wavelength of 940 nm. The beam is collimated by the collimating lens and then is shaped and projected uniformly into the space to form a speckle field through DOE diffraction. The DOE diffraction pattern is realized by multi-region replication. Cases such as the DOE is damaged by external force, and water mist enters the laser source and adheres to a surface of the DOE in a humid environment, etc., may happen during working, which will result in a significant increase in an energy of zero-level region of the DOE, causing harm to human eyes.

Figure 4:
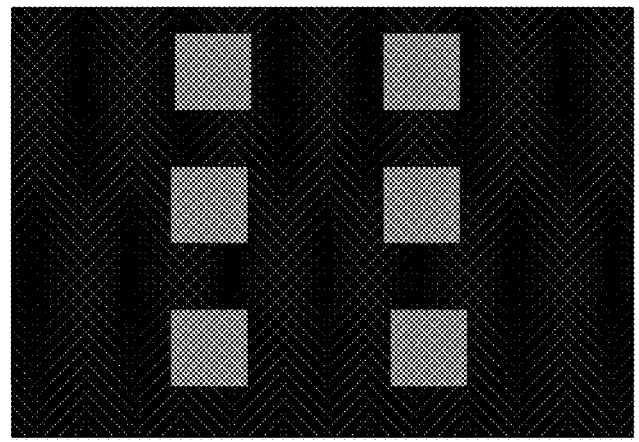
FIG. 4 is an image of speckles projected by a laser source without a zero-level enhancement according to some embodiments of the present disclosure.
Figure 5:
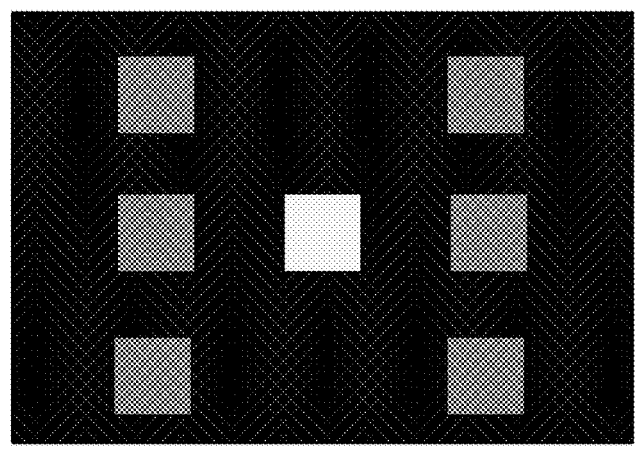
FIG. 5 is an image of speckles projected by the laser source with the zero-level enhancement according to some embodiments of the present disclosure.

Reference is made to FIG. 4 and FIG. 5. FIG. 4 shows a speckle image projected by the laser source without a zero-level enhancement. In normal use, the speckles will not cause harm to the human eyes. FIG. 5 shows a speckle image projected by the laser source with the zero-level enhancement. In this case, if a speckle in the zero-level region is projected to a human eye, it will cause harm to the human eye, while a speckle in a non-zero-level region is projected to a human eye, it will not cause harm to the human eye.

With the control method for the electronic device 10 and the electronic device 10 according to the embodiments of the present disclosure, whether a human eye enters the zero-level region 20 is determined according to the original pixel position 21 of the zero-level region 20 on the infrared sensor 12, and the human eye pixel position 31 of the human eye region 30 on the visible light sensor 13. When the human eye enters the zero-level region 20, the protection mechanism of the infrared emitter 11 is triggered, thus preventing a strong zero-level beam from harming the human eye.

As shown in FIG. 2, the electronic device 10 may be a mobile phone, a tablet computer, a notebook computer, a smart bracelet, a smart watch, or the like. In the embodiments of the present disclosure, the electronic device 10 is a mobile phone. It can be understood that the electronic device 10 may be any other specific type, which is not limited herein.

The electronic device 10 may further include a display screen 15 and a housing 16. The infrared emitter 11, the infrared sensor 12, the visible light sensor 13 and the display screen 15 can all be installed on the housing 16. The housing 16 includes a front surface 161 and a back surface 162 opposite to the front surface 161. The display screen 15 is installed on the front surface 161, and is configured to display information such as an image and a text, or to receive a user touch operation. The infrared emitter 11, the infrared sensor 12, and the visible light sensor 13 may be installed on the front surface 161 to allow a user to take selfies or make video calls. It is also possible that the infrared emitter 11, the infrared sensor 12, and the visible light sensor 13 are installed on the back surface 162 to allow a user to shoot scenery and other people.

In an embodiment, the infrared emitter 11 and the infrared sensor 12 may constitute a structured light module. The infrared emitter 11 is configured to project a laser pattern into a target space, and the infrared sensor 12 is configured to collect the laser pattern to obtain depth information. In another embodiment, the infrared emitter 11 and the infrared sensor 12 may constitute a time of flight (TOF) module. The infrared emitter 11 is configured to emit a laser light into a target space, and the infrared sensor 12 is configured to receive a reflected laser light and obtain depth information according to a time difference between emission and reception.

The visible light sensor 13 may constitute a visible light module. The visible light module may be a telephoto camera, a wide-angle camera, or a periscope camera. The visible light sensor 13 may be located between the infrared emitter 11 and the infrared sensor 12, to make a distance between the infrared emitter 11 and the infrared sensor 12 longer, and increase a length of a base line of the structured light module or the TOF module, thus improving the accuracy of the depth information obtained.

The existing structured light modules are all arranged at the front surface of the electronic device. In addition, a distance sensor is required to be set to determine a distance for protecting the safety of the human eyes. If the structured light module is arranged at the back of the electronic device, it may cause the following disadvantage. First, in order to protect the safety of human eyes, a distance sensor is required to be added to determine the distance (a low-power projection laser is used when the distance is short, and a normal power projection laser is used when the distance is long), resulting in increased costs. Second, the structured light module will occupy a space of a back construction of the mobile phone, which may affect a product design. Third, modeling of a close small object is limited by the distance sensor. Fourth, proximity of an object other than eyes and skin will also trigger eye protection, and thus an interactive experience of a user is not good.

In the embodiments of the present disclosure, by using the original pixel position 21 of the zero-level region 20 on the infrared sensor 12 and the human eye pixel position 31 of the human eye region 30 on the visible light sensor 13, whether a human eye enters the zero-level region 20 is determined. When the human eye does not enter the zero-level region 20, the infrared emitter 11 works normally. When the human eye enters the zero-level region 20, the protection mechanism of the infrared emitter 11 is triggered, and the working mode of the infrared emitter 11 is adjusted to avoid the harm to the human eyes caused by the strong zero-level beam. The structured light module or the TOF module according to the embodiments of the present disclosure can be arranged at the front or the back. When it is arranged at the back, there is no need to add the distance sensor, thus reducing the cost, and saving space for the back of the electronic device 10. For the present module, it is also possible to perform the modeling of a close object other than eyes and skin.

Referring to FIGS. 2 and 3, the human eye pixel position 31 of the human eye region 30 on the visible light sensor 13 refers to a coordinate position of the human eye region 30 on the visible light sensor 13. Similarly, the original pixel position 21 of the zero-level region 20 on the infrared sensor 12 refers to a coordinate position of the zero-level region 20 on the infrared sensor 12. The coordinate position of the zero-level region 20 is generally fixed, and may be acquired and stored in advance by the processor 14 before the user uses the electronic device 10. This coordinate position may be updated in a predetermined period, to avoid position shifting of the zero-level region 20 in a long-term use, which is caused by a position shift of the DOE or damage to the DOE. By pre-acquiring the original pixel position 21 of the zero-level region 20 on the infrared sensor 12, the time required for the electronic device 10 to determine whether the human eye enters the zero-level region 20 can be shortened. Alternatively, the processor 14 may acquire the original pixel position 21 of the zero-level region 20 on the infrared sensor 12 and the human eye pixel position 31 of the human eye region 30 on the visible light sensor 13 simultaneously. Alternatively, the processor 14 may first acquire the human eye pixel position 31 of the human eye region 30 on the visible light sensor 13 and then acquire the original pixel position 21 of the zero-level region 20 on the infrared sensor 12.

A process for the processor 14 to acquire the original pixel position 21 of the zero-level region 20 on the infrared sensor 12 may be as follows. The position of the zero-level region 20 of the infrared emitter 11 is firstly determined. For example, a plurality of light detection elements such as photo-diodes (PDs) are uniformly set at a light outlet of the infrared emitter 11 to detect an intensity of the laser light projected at each position from the light outlet of the infrared emitter 11, and a position with the highest laser intensity is the position of the zero-level region 20. Since a relative position of the infrared sensor 12 to the infrared emitter 11 is fixed, the position of the zero-level region 20 of the infrared emitter 11 can be converted to the original pixel position 21 of the zero-level region 20 on the infrared sensor 12.

Figure 6:
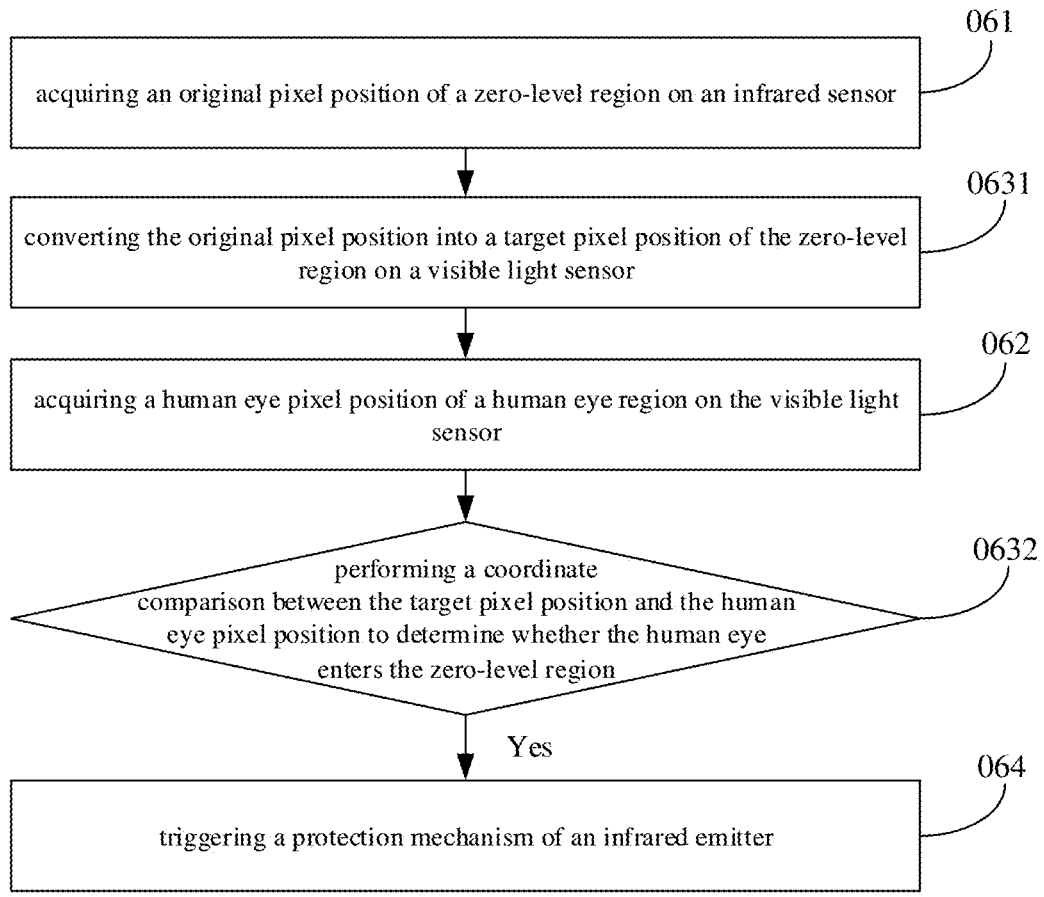
FIG. 6 a flowchart of a control method for an electronic device according to some embodiments of the present disclosure.

Referring to FIG. 6, in some embodiments, the control method for the electronic device 10 further includes: in block 0631, converting the original pixel position 21 into a target pixel position 22 of the zero-level region 20 on the visible light sensor 13; and in block 0632, performing a coordinate comparison between the target pixel position 22 and the human eye pixel position 31 to determine whether the human eye enters the zero-level region 20.

In some embodiments, the processor 14 as shown in FIG. 2 may be configured to perform the process as described in blocks 0631 and 0632.

In other words, the processor 14 may be configured to: convert the original pixel position 21 into a target pixel position 22 of the zero-level region 20 on the visible light sensor 13; and perform a coordinate comparison between the target pixel position 22 and the human eye pixel position 31 to determine whether the human eye enters the zero-level region 20.

Contents and details in blocks 061, 062 and 064 as shown in FIG. 6 may refer to the description of blocks 011, 012 and 014, and thus are not described in detail here.

As shown in FIGS. 2 and 3, after the electronic device 10 is assembled, since the distance between the infrared sensor 12 and the visible light sensor 13 is fixed, the original pixel position 21 on the infrared sensor 12 can be converted into the target pixel position 22 on the visible light sensor 13 according to the distance between the infrared sensor 12 and the visible light sensor 13.

After acquiring the original pixel position 21 of the zero-level region 20 on the infrared sensor 12, the processor 14 converts the original pixel position 21 into the target pixel position 22 of the zero-level region 20 on the visible light sensor 13 to allow the coordinate comparison between the human eye pixel position 31 of the human eye region 30 and the target pixel position 22 of the zero-level region 20 in the same coordinate of the visible light sensor 13, to determine whether the human eye enters the zero-level region 20. Similar to pre-acquiring the original pixel position 21 of the zero-level region 20 on the infrared sensor 12, the processor 14 may also pre-acquire and pre-store the target pixel position 22 of the zero-level region 20 on the visible light sensor 13, and update the target pixel position 22 in a predetermined period. In this case, the time required for the electronic device 10 to determine whether the human eye enters the zero-level region 20 is shortened, and the accuracy of the acquired target pixel position 22 can be guaranteed at the same time.

In some other embodiments, the processor 14 may convert the human eye pixel position 31 of the human eye region 30 on the visible light sensor 13 into a target pixel position 22' of the human eye region 30 on the infrared sensor 12, to perform the coordinate comparison between the target pixel position 22' of the human eye region 30 and the original pixel position 21 of the zero-level region 20 in a same coordinate of the infrared sensor 12, to determine whether the human eye enters the zero-level region 20.

Figure 7:
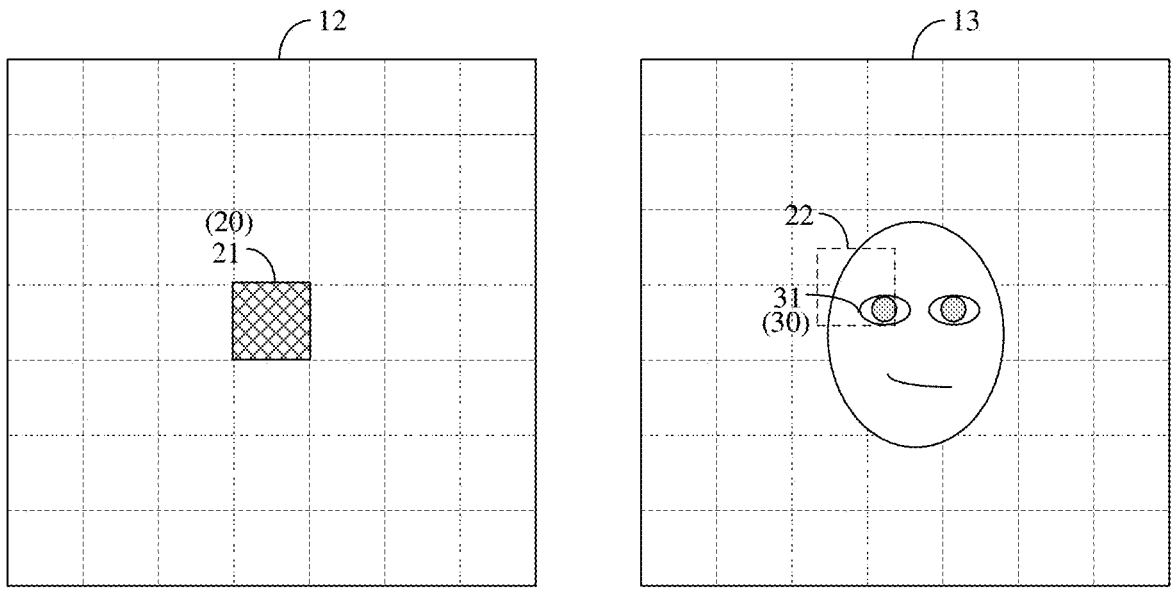
FIG. 7 is a schematic diagram showing an application scene for a control method for an electronic device according to some embodiments of the present disclosure.

As shown in FIGS. 3 and 7, it is determined that the human eye enters the zero-level region 20 when a coordinate range of the human eye pixel position 31 is within a coordinate range of the target pixel position 22 (as shown in FIG. 3) or when the coordinate range of the human eye pixel position 31 is partially overlapped with the coordinate range of the target pixel position 22 (as shown in FIG. 7). In an example, the processor 14 may determine whether the human eye enters the zero-level region 20 according to a ratio of an overlapping portion of the human eye pixel position 31 and the target pixel position 22 to the human eye pixel position 31. When the ratio is greater than a predetermined ratio, for example 60%, it is determined that the human eye has entered the zero-level region 20. This determination method may ensure the safety of the human eye to a greater extent.

Figure 8:
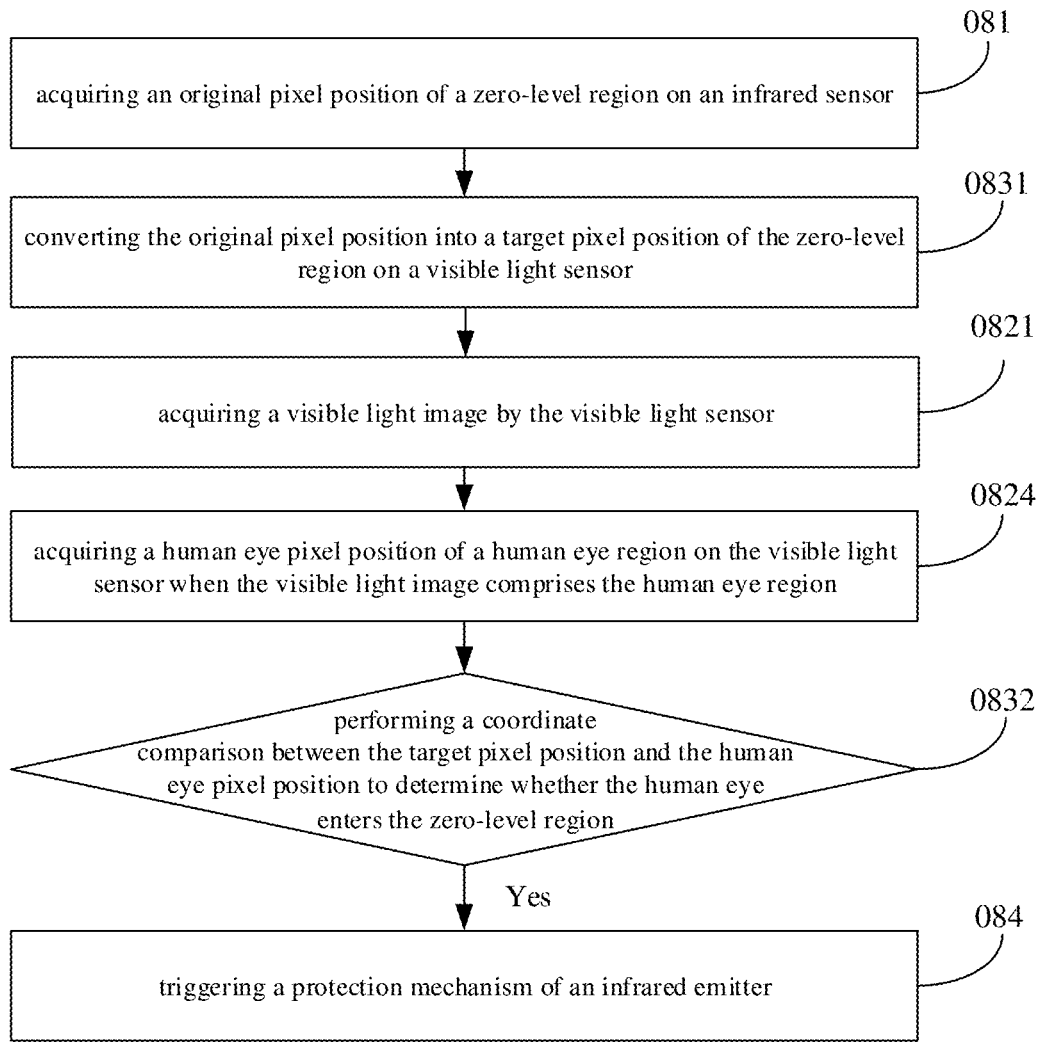
FIG. 8 a flowchart of a control method for an electronic device according to some embodiments of the present disclosure.

Referring to FIG. 8, in some embodiments, the control method for the electronic device 10 further includes: in block 0821, acquiring a visible light image by the visible light sensor 13; and in block 0824, acquiring the human eye pixel position 31 of the human eye region 30 on the visible light sensor 13 when the visible light image includes the human eye region 30.

Referring to FIG. 2, in some embodiments, the visible light sensor 13 may be configured to perform the process in block 0821, and the processor 14 may be configured to perform the process in block 0824.

In other words, the visible light sensor 13 may be configured to acquire a visible light image. The processor 14 may be configured to acquire the human eye pixel position 31 of the human eye region 30 on the visible light sensor 13 when the visible light image includes the human eye region 30.

Contents and details in blocks 081, 0831, 0832 and 084 as shown in FIG. 8 may refer to the description of blocks 011, 0631, 0632 and 014, and thus are not described in detail here.

In an example, the acquisition of the visible light image by the visible light sensor 13 may be performed when the infrared emitter 11 is turned on. That is, when the electronic device 10 turns on the infrared emitter 11 according to the user's control or as needed, the visible light sensor 13 is turned on synchronously to collect the visible light image, which is beneficial to more quickly obtain the human eye pixel position 31 of the human eye region 30 on the visible light sensor 13, thus shortening the time required for the electronic device 10 to determine whether the human eye enters the zero-level region 20. If the human eye does not enter the zero-level region 20, the time for the electronic device 10 to acquire the depth information may also be shortened.

In another example, when the human eye does not enter the zero-level region 20, the infrared emitter 11 is turned on. In other words, the visible light sensor 13 is first turned on to collect the visible light image to determine whether the human eye enters the zero-level region 20. When it is determined that the human eye does not enter the zero-level region 20, the infrared emitter 11 is turned on, thus protecting the human eyes.

Figure 9:
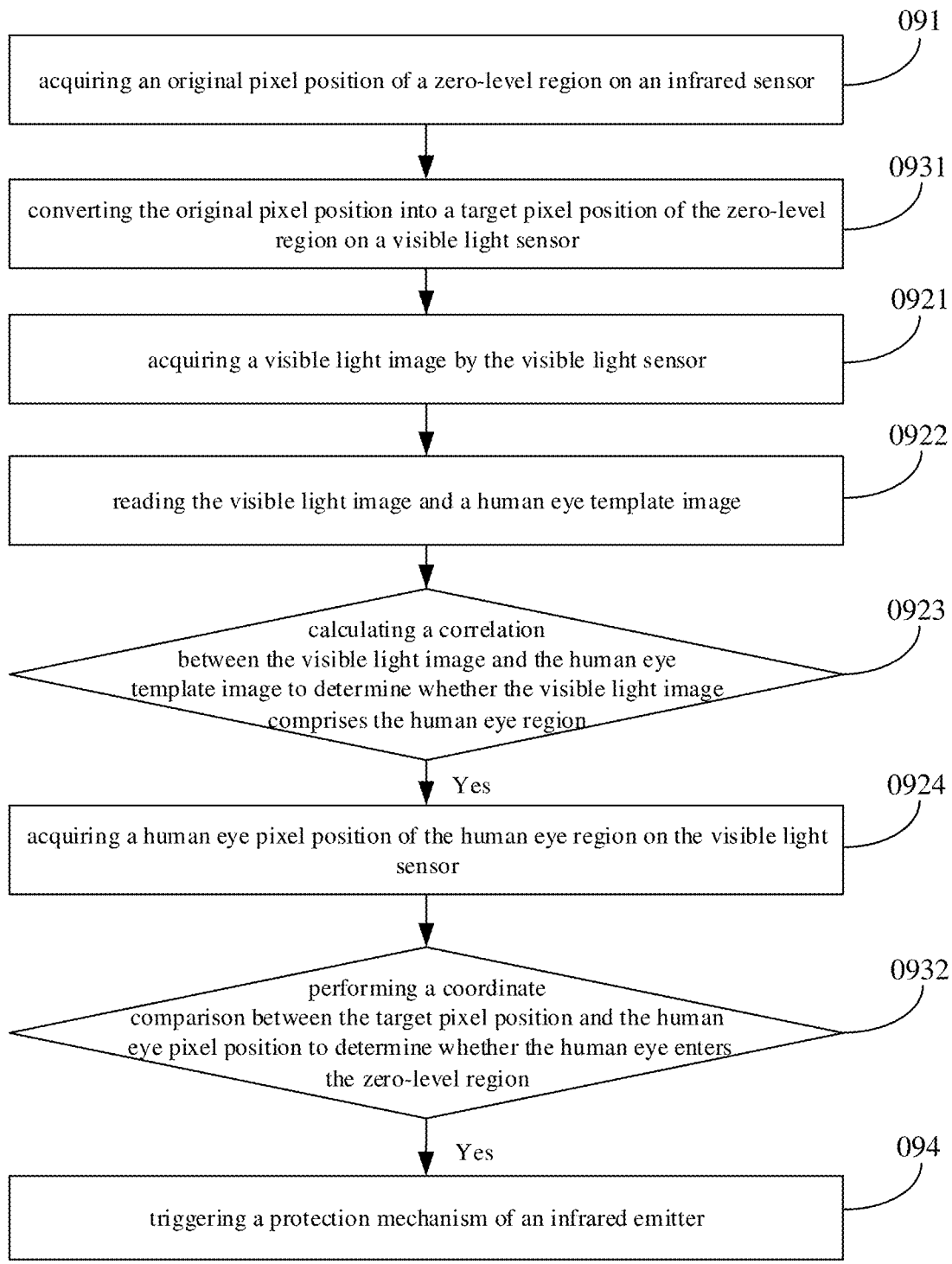
FIG. 9 a flowchart of a control method for an electronic device according to some embodiments of the present disclosure.

Referring to FIG. 9, in some embodiments, the electronic device 10 includes a human eye model library, and the control method for the electronic device 10 further includes: in block 0922, reading the visible light image and the human eye template image; and in block 0923, calculating a correlation between the visible light image and the human eye template image to determine whether the visible light image includes the human eye region 30.

Referring to FIG. 2, in some embodiments, the electronic device 10 includes the human eye model library stored with the human eye template image(s). The processor 14 is configured to perform the process as described in blocks 0922 and 0923.

That is, the processor 14 is configured to read the visible light image and the human eye template image, and calculate a correlation between the visible light image and the human eye template image to determine whether the visible light image includes the human eye region 30.

Contents and details in blocks 091, 0931, 0921, 0924, 0932 and 094 as shown in FIG. 9 may refer to the description of blocks 011, 0631, 0821, 0824, 0632 and 014, and thus are not described in detail here.

Figure 10:
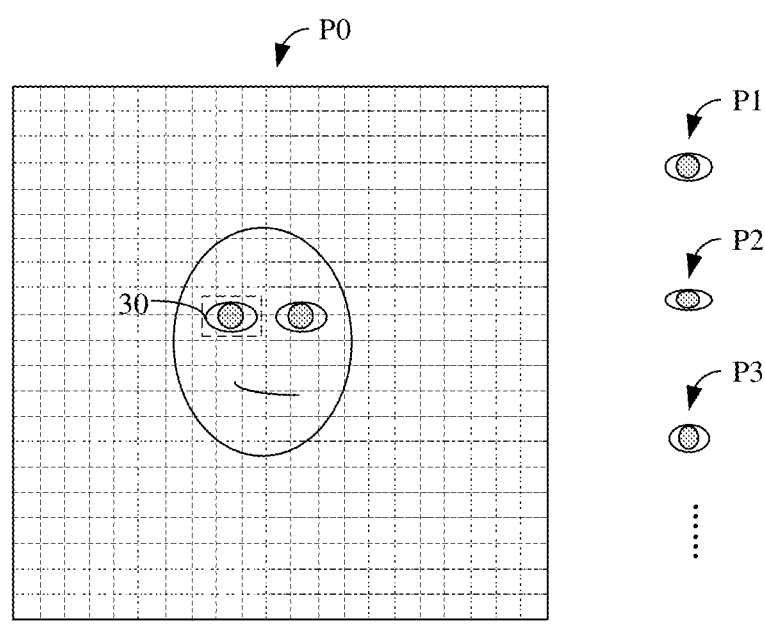
FIG. 10 is a schematic diagram showing an application scene for a control method for an electronic device according to some embodiments of the present disclosure.

In some embodiments, as shown in FIG. 10, the visible light image acquired by the visible light sensor 13 is P0. The human eye model library may store multiple human eye template images P1, P2, P3, etc. The multiple human eye template images may include left eye image(s) and right eye image(s). First, the processor 14 reads the visible light image P0 and the human eye template image P1, and then calculates the correlation between the visible light image P0 and the human eye template image P1 to determine whether the visible light image includes the human eye region 30. If yes, it is determined that the visible light image includes the human eye region 30. If no, the processor 14 continues to read the human eye template image P2, and calculates the correlation between the visible light image P0 and the human eye template image P2 to determine whether the visible light image includes the human eye region 30. If yes, it is determined that the visible light image includes the human eye region 30. If no, the processor 14 continues to read the human eye template image P3, and calculates the correlation between the visible light image P0 and the human eye template image P3 to determine whether the visible light image includes the human eye region 30. By analogy, until the processor 14 calculates every correlation between the visible light image and every human eye template image and determines, according to every correlation, that the human eye region 30 is not included in the visible light image, it is finally determined that the human eye region 30 is not included in the visible light image. If the processor 14 determines that the visible light image includes the human eye region 30 according to the correlation between the visible light image P0 and any human eye template image, it will finally determine that the visible light image includes the human eye region 30, and stop the process of reading the remaining human eye template images and calculating the correlation between the visible light image P0 and any remaining human eye template image to determine whether the visible light image includes the human eye region 30.

After calculating the correlation between the visible light image and the human eye template image, the processor 14 may determine whether the visible light image includes the human eye region 30 according to a value of the correlation between the visible light image and the human eye template image. The visible light image is more similar to the human eye template image, the value of the correlation is higher. Therefore, the processor 14 may determine that the human eye region 30 is included in the visible light image when the value of the correlation is greater than (or equal to) a predetermined value, and determine that the human eye region 30 is not included in the visible light image when the value of the correlation value is less than (or equal to) the predetermined value.

Figure 11:
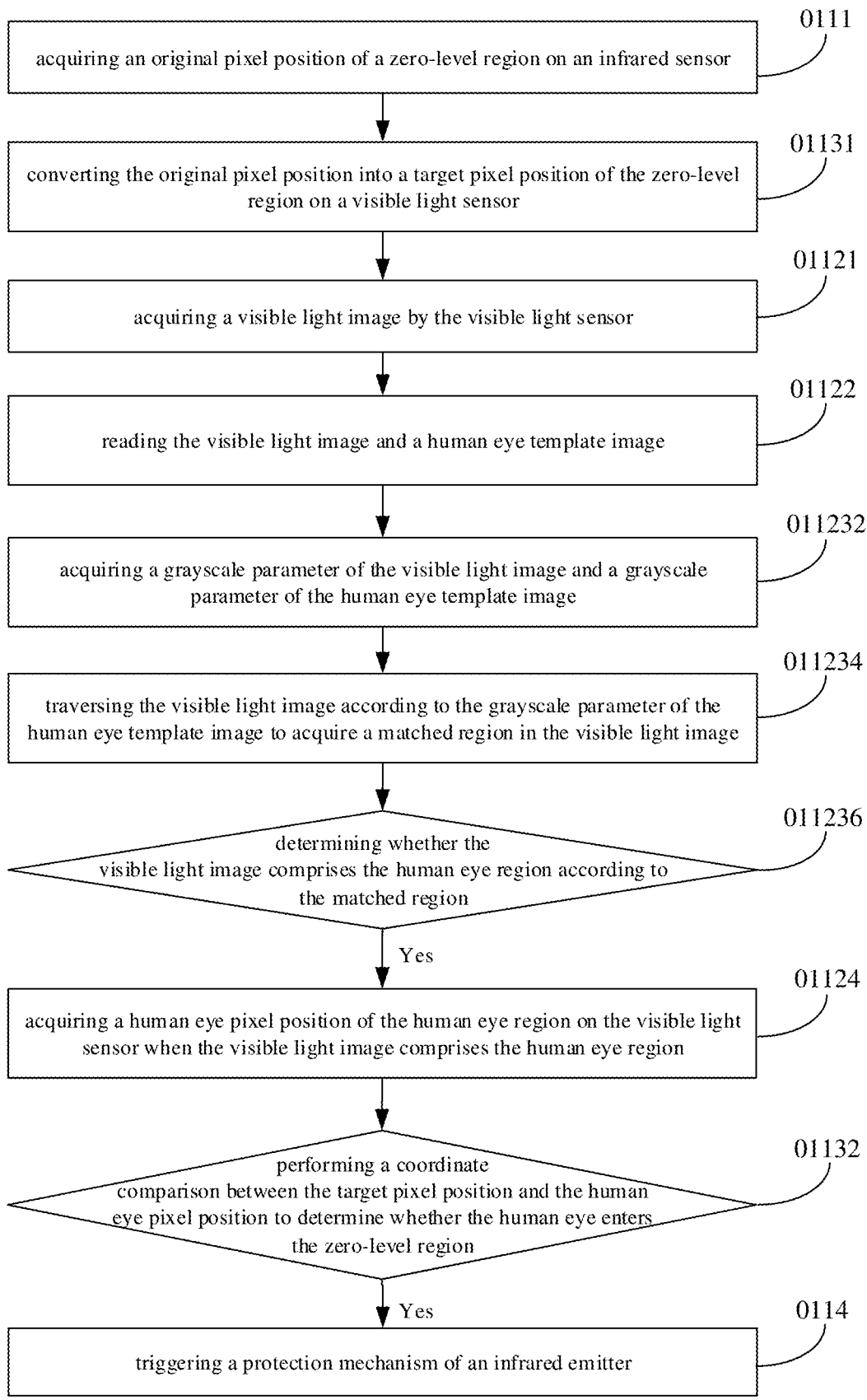
FIG. 11 a flowchart of a control method for an electronic device according to some embodiments of the present disclosure.

Referring to FIG. 11, in some embodiments, the control method for the electronic device 10 further includes: in block 011232, acquiring a grayscale parameter of the visible light image and a grayscale parameter of the human eye template image; in block 011234, traversing the visible light image according to the grayscale parameter of the human eye template image to obtain a matched region in the visible light image, in which a grayscale parameter of the matched region matches the grayscale parameter of the human eye template image; and in block 011236, determining whether the visible light image includes the human eye region 30 according to the matched region.

Referring to FIG. 2, in some embodiments, the processor 14 is configured to perform the process as described in blocks 011232, 011234 and 011236.

In other words, the processor 14 is configured to: acquire a grayscale parameter of the visible light image and a grayscale parameter of the human eye template image; traverse the visible light image according to the grayscale parameter of the human eye template image to obtain a matched region in the visible light image, in which a grayscale parameter of the matched region matches the grayscale parameter of the human eye template image; and determine whether the visible light image includes the human eye region 30 according to the matched region.

Contents and details in blocks 0111, 01131, 01121, 01122, 01132, 01124 and 0114 as shown in FIG. 11 may refer to the description of blocks 011, 0631, 0821, 0922, 0632, 0824 and 014, and thus are not described in detail here.

In an embodiment, as shown in FIG. 10, the processor 14 may divide the visible light image P0 into a plurality of sub-images, and acquire a grayscale parameter of each sub-image. Similarly, the processor 14 may also acquire the grayscale parameters of the human eye template images P1, P2, P3, etc. The grayscale parameter may include a grayscale value and an image mean value, and the image mean value is a normalized grayscale value of the image.

The processor 14 first acquires the grayscale parameters of the sub-images of the visible light image P0 and the grayscale parameter of the human eye template image P1, and searches for a matched region (which is matched with the human eye template image P1 in the grayscale parameter) in the sub-images of the visible light image P0 according to the gray parameter of the human eye template image P1. In this case, the matched region includes one or more sub-images. When multiple sub-images are connected, the multiple sub-images may constitute one matched region. When multiple sub-images are spaced apart from each other, the number of the matched regions is multiple, and each sub-image may serve as a matched region. When the processor 14 cannot acquire the matched region in the visible light image P0 according to the grayscale parameter of the human eye template image P1, the processor 14 continues to acquire the grayscale parameter of the human eye template image P2, and searches for a matched region (which is matched with the human eye template image P2 in the grayscale parameter) in the sub-images of the visible light image P0 according to the gray parameter of the human eye template image P2. When the processor 14 cannot acquire the matched region in the visible light image P0 according to the grayscale parameter of the human eye template image P2, the processor 14 continues to acquire the grayscale parameter of the human eye template image P3, and searches for a matched region (which is matched with the human eye template image P3 in the grayscale parameter) in the sub-images of the visible light image P0 according to the gray parameter of the human eye template image P3. By analogy, until the processor 14 cannot acquire the matched area in the visible light image P0 according to the grayscale parameters of all the human eye template images, it is determined that there is no matched region in the visible light image P0. At this time, the processor 14 determines that the human eye region 30 is not included in the visible light image P0. When the processor 14 acquires the matched region in the visible light image P0 according to the grayscale parameter of any human eye template image, it is determined that the visible light image P0 includes the human eye region 30 according to the matched region. At this time, the matched region is regarded as the human eye region 30.

It should be noted that determining, by the processor, whether the visible light image includes the human eye region 30 according to the matched region includes: determining that the visible light image P0 does not include the human eye region 30 when there is no matched region in the visible light image P0; and determining that the visible light image P0 includes the human eye region 30 when there is the matched region in the visible light image P0. Alternatively, the processor 14 may also add other restrictive conditions such as the number of the matched regions when the matched area is present in the visible light image P0 to further determine whether the visible light image P0 includes the human eye region 30 according to the matched region. For example, in photographing a single person, if the number of the matched regions is greater than 2, the determination of the matched regions may be incorrect, and the human eye region 30 may not be included in the visible light image P0.

Figure 12:
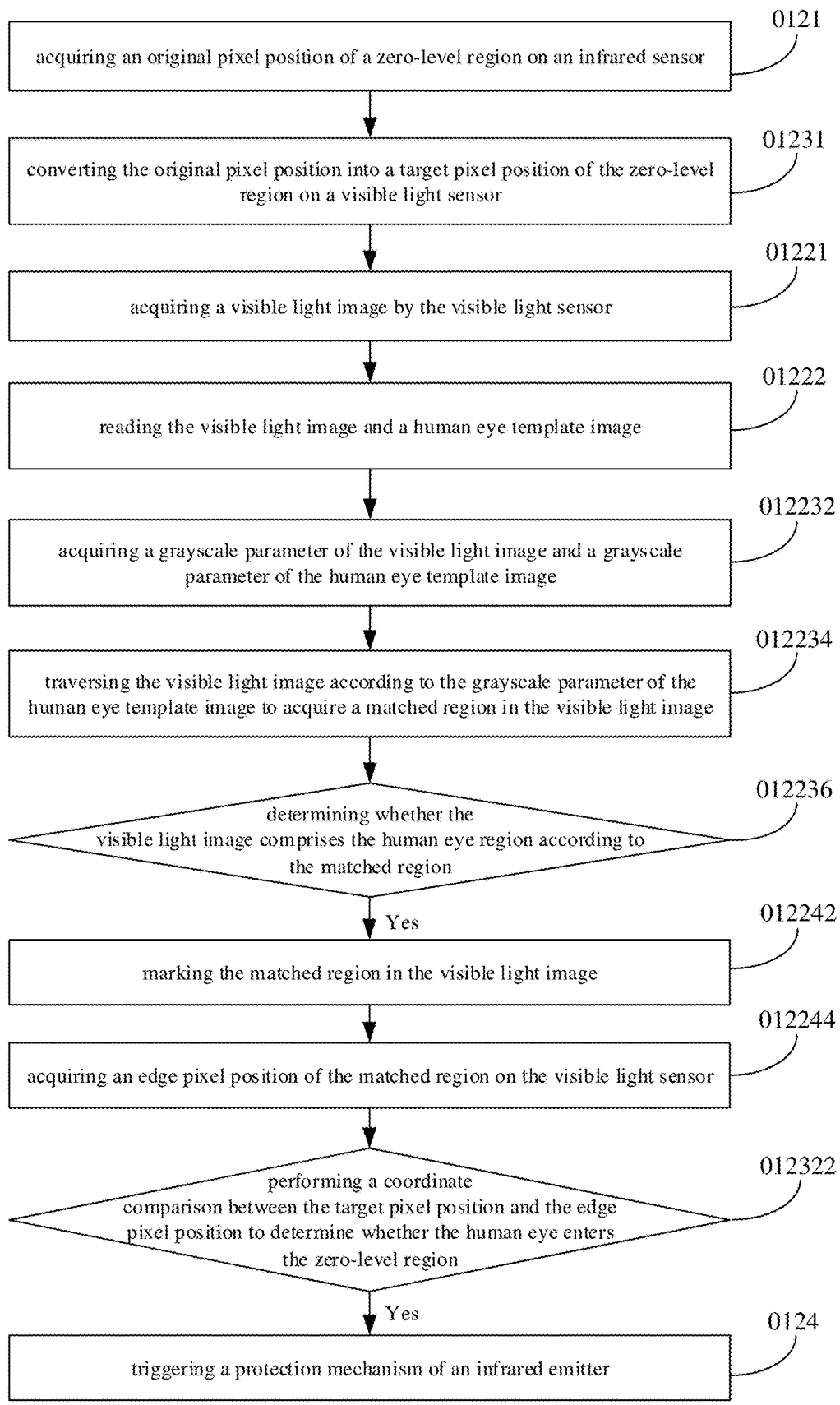
FIG. 12 a flowchart of a control method for an electronic device according to some embodiments of the present disclosure.

Referring to FIG. 12, in some embodiments, the control method for the electronic device 10 further includes: in block 012242, marking the matched region in the visible light image; in block 012244, acquiring an edge pixel position of the matched region on the visible light sensor 13; and in block 012322, performing a coordinate comparison between the target pixel position 22 and the edge pixel position to determine whether the human eye enters the zero-level region 20.

Referring to FIG. 2, in some embodiments, the processor 14 is configured to perform the process as described in blocks 012242, 012244 and 012322.

In other words, the processor 14 is configured to: mark the matched region in the visible light image; acquire an edge pixel position of the matched region on the visible light sensor 13; and perform a coordinate comparison between the target pixel position 22 and the edge pixel position to determine whether the human eye enters the zero-level region 20.

Contents and details in blocks 0121, 01231, 01221, 01222, 012232, 012234, 012236 and 0124 as shown in FIG. 12 may refer to the description of blocks 011, 0631, 0821, 0922, 011232, 011234, 011236 and 014, and thus are not described in detail here.

In an example, the matched region in the visible light image may be marked with a rectangular frame, a ring frame, or any irregular shape frame. By marking the matched region, it may be easier to identify the edge of the matched region. In an example as shown in FIG. 10, the matched region is the human eye region 30, and the human eye (pixels) includes the edge (pixels). Acquiring the edge pixel position of the matched region on the visible light sensor 13 refers to acquiring the edge pixel position of the human eye region 30 on the visible light sensor 13. In other examples, the matched region may have a larger area compared with the human eye region 30, that is, the matching region covers the human eye region 30, which is not limited here. The target pixel position 22 is compared with the edge pixel position to determine whether the human eye enters the zero-level region 20. Compared with the coordinate comparison between the target pixel position 22 and the human eye pixel position 31, less calculation is required to be performed by the processor 14 when the target pixel position 22 is compared with the edge pixel position. Moreover, the determination based on the edge pixel position can ensure the safety of the human eyes.

Figure 13:
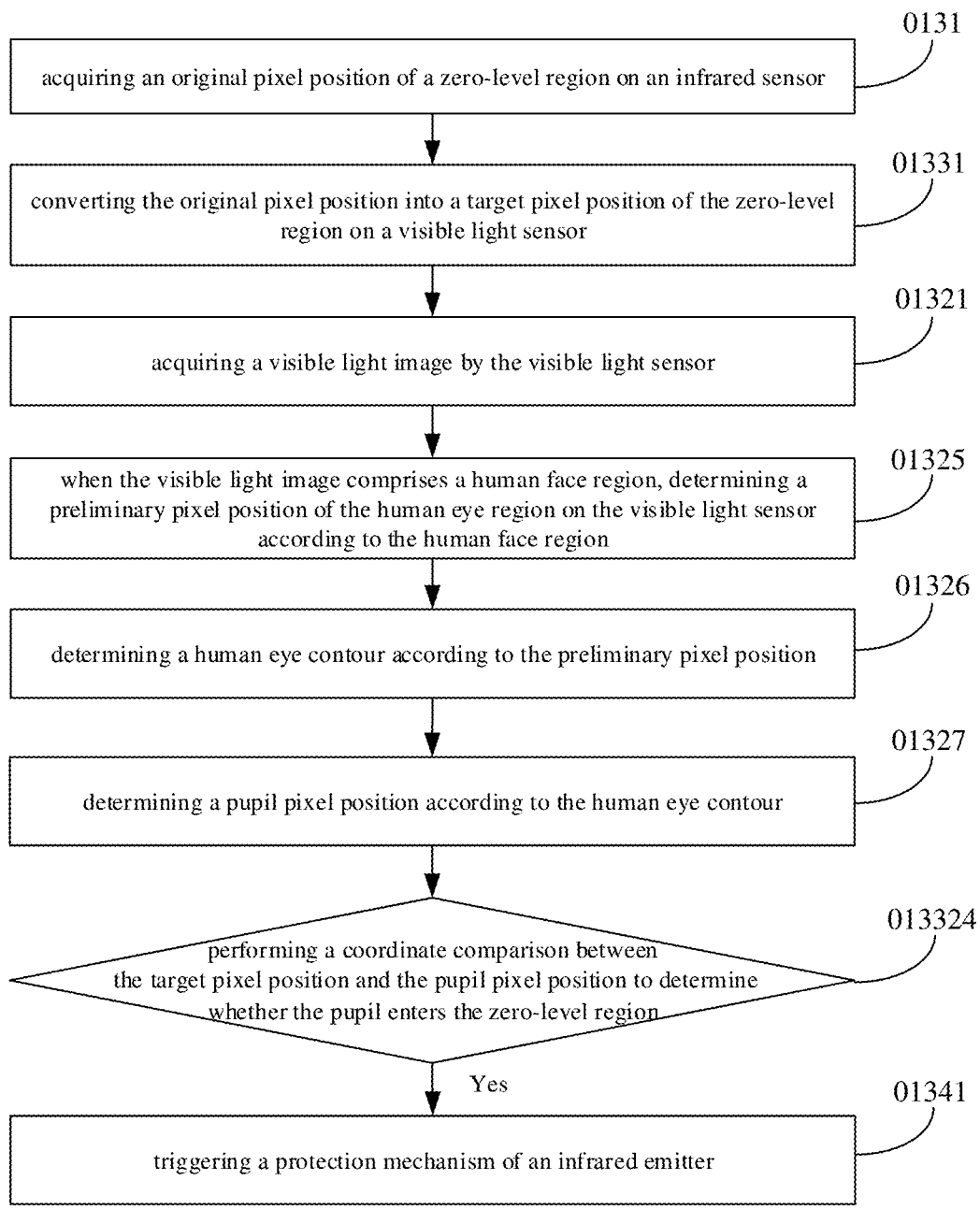
FIG. 13 a flowchart of a control method for an electronic device according to some embodiments of the present disclosure.

Referring to FIGS. 3 and 13, in some embodiments, the human eye includes a pupil, and the control method for the electronic device 10 further includes: in block 01321, acquiring a visible light image by the visible light sensor 13; in block 01325, when the visible light image includes a human face region, determining a preliminary pixel position of the human eye region 30 on the visible light sensor 13 according to the human face region; in block 01326, determining a human eye contour according to the preliminary pixel position; in block 01327, determining a pupil pixel position 32 according to the human eye contour; in block 013324, performing a coordinate comparison between the target pixel position 22 and the pupil pixel position 32 to determine whether the pupil enters the zero-level region 20; and in block 01341, triggering the protection mechanism of the infrared emitter 11 when the pupil enters the zero-level region 20.

Referring to FIG. 2, in some embodiments, the human eye includes a pupil, and the processor 14 is configured to perform the process as described in blocks 01325, 01326, 01327, 013324 and 01341.

In other words, the visible light sensor 13 is configured to acquire a visible light image. The processor 14 is configured to: when the visible light image includes a human face region, determine a preliminary pixel position of the human eye region 30 on the visible light sensor 13 according to the human face region; determine a human eye contour according to the preliminary pixel position; determine a pupil pixel position 32 according to the human eye contour; perform a coordinate comparison between the target pixel position 22 and the pupil pixel position 32 to determine whether the pupil enters the zero-level region 20; and trigger the protection mechanism of the infrared emitter 11 when the pupil enters the zero-level region 20.

Contents and details in blocks 0131 and 01331 as shown in FIG. 13 may refer to the description of blocks 011 and 0631, and thus are not described in detail here.

Specifically, referring to FIG. 3, the processor 14 can recognize whether the visible light image includes a human face region by a face detection technology. When the visible light image includes the face region, the preliminary pixel position of the human eye region 30 on the visible light sensor 13 can be determined according to a regularity of distribution of the human eye region 30 in the face region. This regularity may be obtained by a large number of experimental statistics. For example, the human eye region 30 is generally located at the upper left and upper right corners of the face region and proportions of length and width are generally in a certain value range. After this, the eye contour is further accurately determined, and the pupil pixel position 32 is determined according to the human eye contour, and the pupil pixel position 32 is compared with the target pixel position 22 to determine whether the pupil enters the zero-level region 20. The pupil serves as a channel for light to enter the eye, and it is more accurate and rigorous to use this process to determine whether the human eye enters the zero-level region 20.

Figure 14:
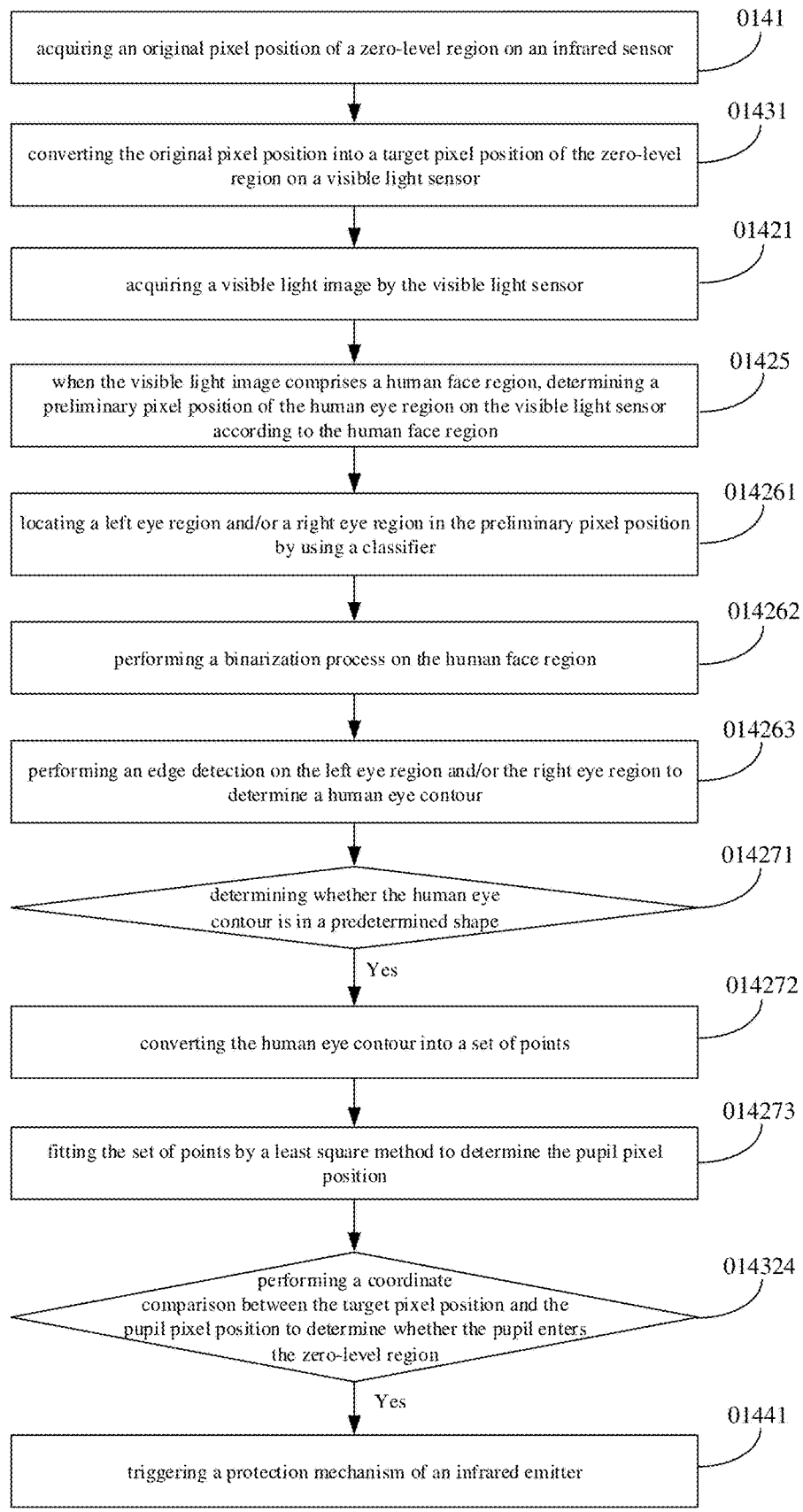
FIG. 14 a flowchart of a control method for an electronic device according to some embodiments of the present disclosure.

Referring to FIGS. 3 and 14, in some embodiments, the control method for the electronic device 10 further includes: in block 014261, locating a left eye region and/or a right eye region in the preliminary pixel position by using a classifier; in block 014262, performing a binarization process on the human face region; in block 014263, performing an edge detection on the left eye region and/or the right eye region to determine the human eye contour; in block 014271, determining whether the human eye contour is in a predetermined shape; in block 014272, converting the human eye contour into a set of points when the human eye contour is in the predetermined shape; and in block 014273, fitting the set of points by a least square method to determine the pupil pixel position 32.

Referring to FIG. 2, in some embodiments, the processor 14 is configured to perform the process as described in blocks 014261, 014262, 014263, 014271, 014272 and 014273.

In other words, the processor 14 is configured to: locate a left eye region and/or a right eye region in the preliminary pixel position by using a classifier; perform a binarization process on the human face region; perform an edge detection on the left eye region and/or the right eye region to determine the human eye contour; determine whether the human eye contour is in a predetermined shape; convert the human eye contour into a set of points when the human eye contour is in the predetermined shape; and fit the set of points by a least square method to determine the pupil pixel position 32.

Contents and details in blocks 0141, 01431, 01421, 01425, 014324 and 01441 as shown in FIG. 14 may refer to the description of blocks 011, 0631, 01321, 01325, 013324 and 01341, and thus are not described in detail here.

In an example, the processor 14 may utilize the eye classifier/an eye training model to locate the left eye region and/or the right eye region. It can be understood that if only the left eye is captured in the visible light image, the left eye region is located, if only the right eye is captured in the visible light image, the right eye region is located, and if the left and right eyes are captured in the visible light image, the left and right eye regions are both located. The binarization process of the human face region can make the contour(s) of the human eye(s) more distinct, which is beneficial to the edge detection for determining the human eye contour. After the edge detection is performed on the left eye region and/or the right eye region to determine the human eye contour, the processor 14 further determines whether the human eye contour is in the predetermined shape, such as an arc shape. It can be understood that when the human eye contour is not in the predetermined shape, for example, when it has a shape of a square or a triangle, it means that the contour is not actually a human eye, and the eye contour detection needs to be performed again. When the human eye contour is in the predetermined shape, the processor 14 converts the human eye contour into a set of points, and uses the least square method to curve-fit the set of points to acquire an arc center, which is considered as the pupil pixel position 32.

Figure 15:
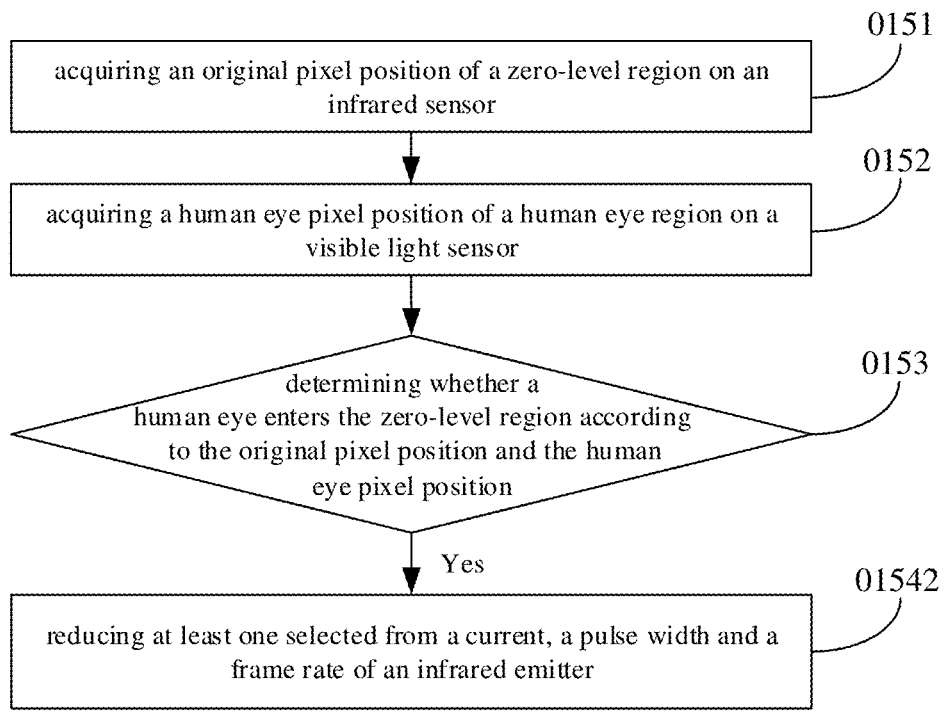
FIG. 15 a flowchart of a control method for an electronic device according to some embodiments of the present disclosure.
Figure 16:
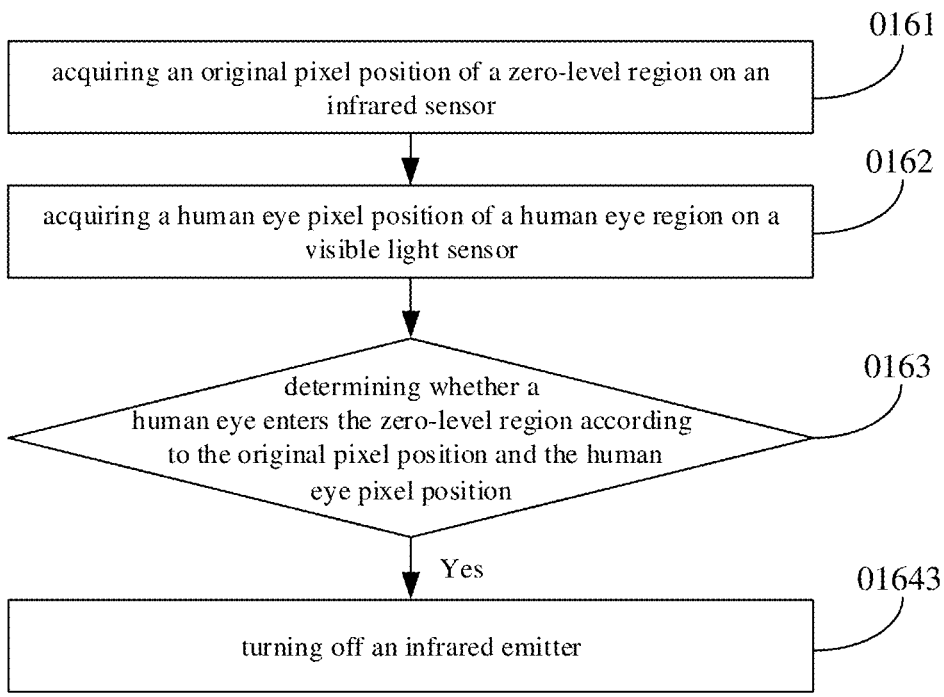
FIG. 16 a flowchart of a control method for an electronic device according to some embodiments of the present disclosure.

Referring to FIGS. 15 and 16, in some embodiments, the control method for the electronic device 10 further includes: in block 01542, reducing at least one selected from a current, a pulse width and a frame rate of the infrared emitter 11 when the human eye enters the zero-level region 20; or in block 01643, turning off the infrared emitter 11 when the human eye enters the zero-level region 20.

Referring to FIG. 2, in some embodiments, the processor 14 is configured to perform the process in block 01542 or 01643.

In other words, the processor 14 is configured to: reduce at least one selected from a current, a pulse width and a frame rate of the infrared emitter 11 when the human eye enters the zero-level region 20; or turn off the infrared emitter 11 when the human eye enters the zero-level region 20.

Contents and details in blocks 0151, 0152 and 0153 as shown in FIG. 15 may refer to the description of blocks 011, 012 and 013, contents and details in blocks 0161, 0162 and 0163 as shown in FIG. 16 may refer to the description of blocks 011, 012 and 013, and thus are not described in detail here.

Figure 17A:
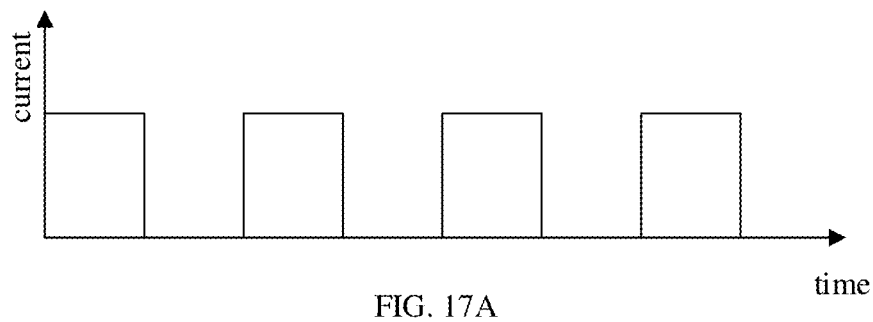
FIG. 17A is a graph showing a current of an infrared emitter of an electronic device for emitting a laser beam according to some embodiments of the present disclosure.
Figure 17B:
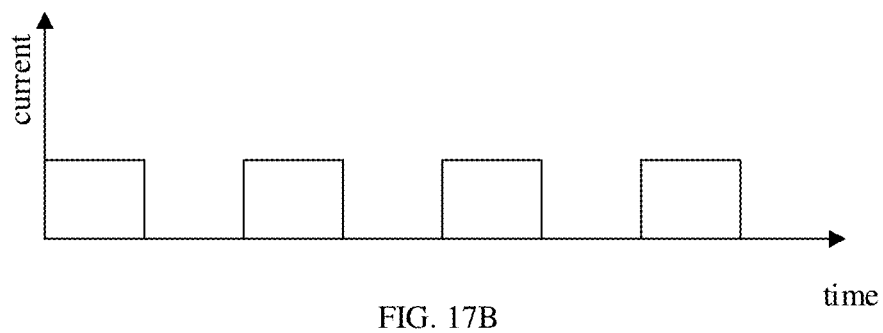
FIG. 17B is a graph showing a reduced current of an infrared emitter of an electronic device for emitting a laser beam according to some embodiments of the present disclosure.
Figure 18A:
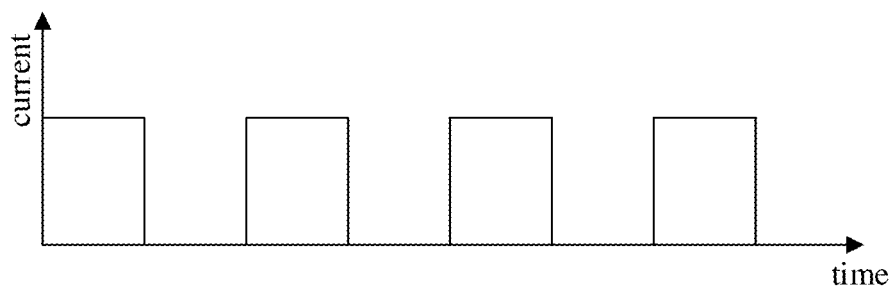
FIG. 18A is a graph showing a pulse width of an infrared emitter of an electronic device for emitting a laser beam according to some embodiments of the present disclosure.
Figure 18B:
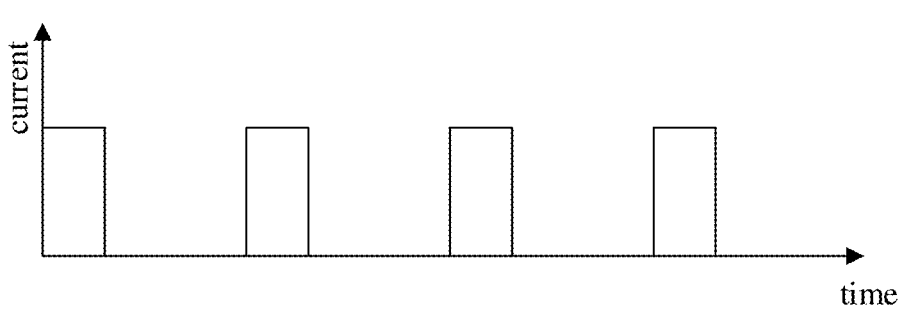
FIG. 18B is a graph showing a reduced pulse width of an infrared emitter of an electronic device for emitting a laser beam according to some embodiments of the present disclosure.
Figure 19A:
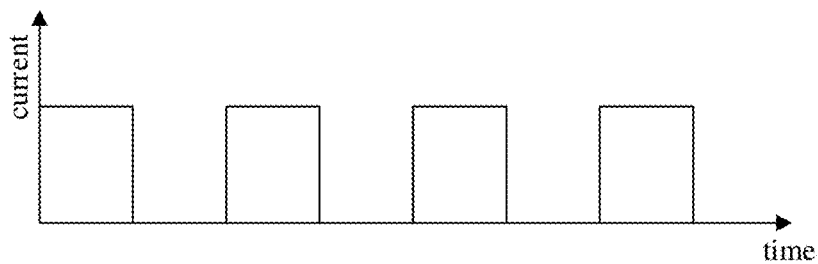
FIG. 19A is a graph showing a frame rate of an infrared emitter of an electronic device for emitting a laser beam according to some embodiments of the present disclosure.
Figure 19B:
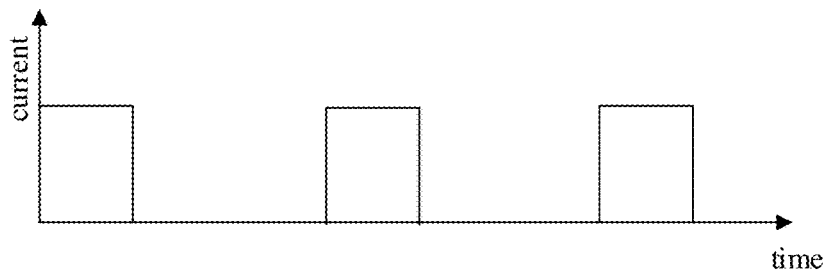
FIG. 19B is a graph showing a reduced frame rate of an infrared emitter of an electronic device for emitting a laser beam according to some embodiments of the present disclosure.

In some embodiments, when the human eye enters the zero-level region 20, the processor 14 may reduce at least one selected from the current, the pulse width, and the frame rate of the infrared emitter 11 to protect the safety of the human eye. For example, the processor 14 may reduce the current of the infrared emitter 11 for emitting a laser (as shown in FIGS. 17A and 17B). The reduced current of the infrared emitter 11 may be ½, ⅓, ¼, etc. of a current of the infrared emitter 11 when the human eye does not enter the zero-level region 20. Alternatively, the processor 14 may reduce the pulse width of the infrared emitter 11 for emitting the laser (as shown in FIGS. 18A and 18B). The reduced pulse width of the infrared emitter 11 may be ½, ⅓, ¼, etc. of a pulse width of the infrared emitter 11 when the human eye does not enter the zero-level region 20. Alternatively, the processor 14 may reduce the frame rate of the infrared emitter 11 for emitting the laser (as shown in FIGS. 19A and 19B). The reduced frame rate of the infrared emitter 11 may be ½, ⅓, ¼, etc. of a frame rate of the infrared emitter 11 when the human eye does not enter the zero-level region 20. Alternatively, the processor 14 may reduce any combination of the current, the pulse width and the frame rate, which is not described in detail herein.

In other embodiments, when the human eye enters the zero-level region 20, the processor 14 directly turn off the infrared emitter 11 to protect the safety of the human eye.

Figure 20:
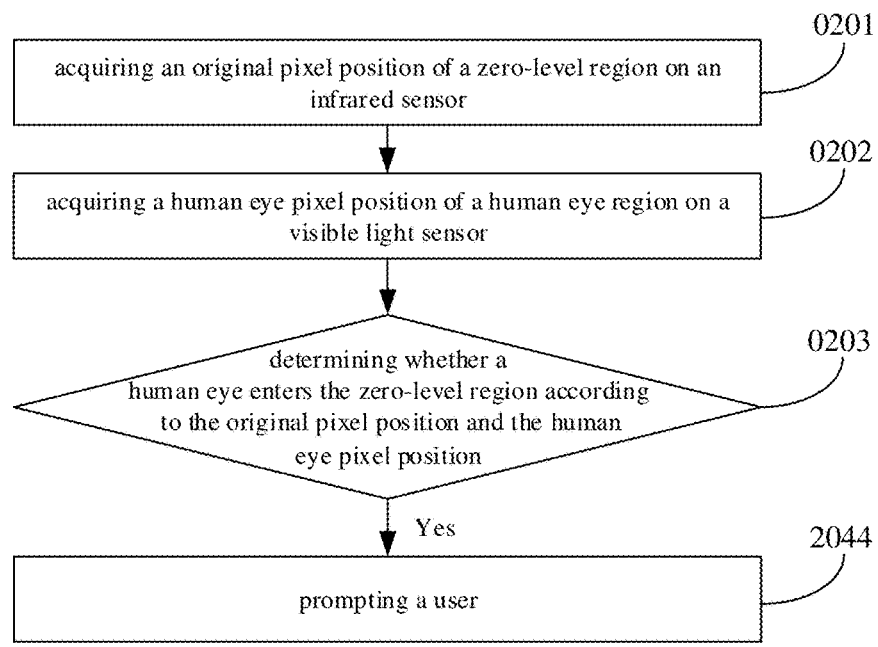
FIG. 20 a flowchart of a control method for an electronic device according to some embodiments of the present disclosure.

Referring to FIG. 20, in some embodiments, the control method for the electronic device 10 further includes: in block 02044, prompting a user when the human eye enters the zero-level region 20.

Referring to FIG. 2, in some embodiments, the processor 14 is configured to perform the process in block 02044.

In other words, the processor 14 is configured to prompt a user when the human eye enters the zero-level region 20.

Contents and details in blocks 0201, 0202 and 0203 as shown in FIG. 20 may refer to the description of blocks 011, 012 and 013, and thus are not described in detail here.

In some embodiments, the processor 14 prompts the user when the human eye enters the zero-level region 20, for example prompts the user to turn off the infrared emitter 11, or prompts the user to move the head in such a way that the human eyes are outside the zero-level region 20. In an example, the processor 14 may also prompt the user to move the head in a direction, such as to the left or right, according to the position of the human eye in the zero-level region 20 when the human eye enters the zero-level region 20, to make the human eye move outside the zero-level region 20.

In addition, the processor 14 may also reduce at least one selected from the current, the pulse width, and the frame rate of the infrared emitter 11 when the human eye enters the zero-level region 20, and prompt the user at the same time. Alternatively, the processor 14 may turn off the infrared emitter 11 when the human eye enters the zero-level region 20, and prompt the user at the same time.

Figure 21:
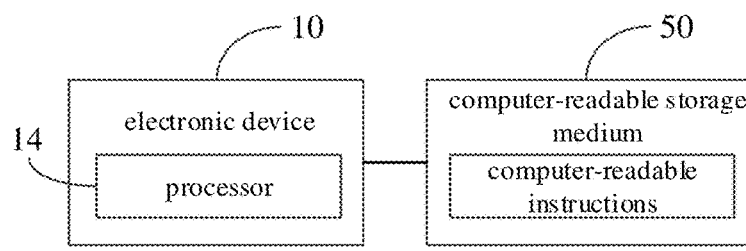
FIG. 21 a block diagram showing an interaction between a computer-readable storage medium and an electronic device according to some embodiments of the present disclosure.

Referring to FIG. 21, the present disclosure provides in embodiments a non-transitory computer-readable storage medium 50 containing computer-readable instructions that, when executed by a processor 14, causes the processor 14 to perform the control method for the electronic device 10 as described in any of the above embodiments.

For example, when the computer-readable instructions are executed by the processor 14, the processor 14 performs the control method for the electronic device 10 as described in the following blocks: in block 011, acquiring an original pixel position 21 of a zero-level region 20 on the infrared sensor 12; in block 012, acquiring a human eye pixel position 31 of a human eye region 30 on the visible light sensor 13; in block 013, determining whether a human eye enters the zero-level region 20 according to the original pixel position 21 and the human eye pixel position 31; in block 014, triggering a protection mechanism of the infrared emitter 11 when the human eye enters the zero-level region 20.

For another example, when the computer-readable instructions are executed by the processor 14, the processor 14 performs the control method for the electronic device 10 as described in the following blocks: in block 0631, converting the original pixel position 21 into a target pixel position 22 of the zero-level region 20 on the visible light sensor 13; and in block 0632, performing a coordinate comparison between the target pixel position 22 and the human eye pixel position 31 to determine whether the human eye enters the zero-level region 20.

Reference throughout this specification to "some embodiments," "an embodiment", "example," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Any process or method described in the flowchart or described in other ways herein may represent a module, segment, or portion of code that includes one or more executable instructions to implement the specified logic function(s) or that includes one or more executable instructions of the steps of the progress. It can be understood by those skilled in the art that the scope of the embodiments of the present disclosure include other implementations, where the order of steps executed may differ from those shown in the flowchart or described herein. For example, the function may be realized in a manner executing the steps simultaneously or in a reverse order.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A control method for an electronic device, wherein the electronic device comprises an infrared emitter, an infrared sensor, and a visible light sensor, and the control method comprises:
acquiring an original pixel position of a zero-level region on the infrared sensor;
acquiring a human eye pixel position of a human eye region on the visible light sensor;
determining whether a human eye enters the zero-level region according to the original pixel position and the human eye pixel position, comprising:
converting the original pixel position into a target pixel position of the zero-level region on the visible light sensor; and
performing a coordinate comparison between the target pixel position and the human eye pixel position to determine whether the human eye enters the zero-level region; and
triggering a protection mechanism of the infrared emitter when the human eye enters the zero-level region.

2. The control method according to claim 1, wherein acquiring the human eye pixel position of the human eye region on the visible light sensor comprises:
acquiring a visible light image by the visible light sensor; and
acquiring the human eye pixel position of the human eye region on the visible light sensor when the visible light image comprises the human eye region.

3. The control method according to claim 2, wherein the electronic device comprises a human eye model library stored with a human eye template image, and acquiring the human eye pixel position of the human eye region on the visible light sensor further comprises:
reading the visible light image and the human eye template image; and
calculating a correlation between the visible light image and the human eye template image to determine whether the visible light image comprises the human eye region.

4. The control method according to claim 3, wherein calculating the correlation between the visible light image and the human eye template image to determine whether the visible light image comprises the human eye region comprises:
acquiring a grayscale parameter of the visible light image and a grayscale parameter of the human eye template image;
traversing the visible light image according to the grayscale parameter of the human eye template image to obtain a matched region in the visible light image, wherein a grayscale parameter of the matched region matches the grayscale parameter of the human eye template image; and
determining whether the visible light image comprises the human eye region according to the matched region.

5. The control method according to claim 4, wherein acquiring the human eye pixel position of the human eye region on the visible light sensor when the visible light image comprises the human eye region comprises:
marking the matched region in the visible light image; and
acquiring an edge pixel position of the matched region on the visible light sensor; and
wherein performing the coordinate comparison between the target pixel position and the human eye pixel position to determine whether the human eye enters the zero-level region comprises:
performing a coordinate comparison between the target pixel position and the edge pixel position to determine whether the human eye enters the zero-level region.

6. The control method according to claim 1, wherein the human eye comprises a pupil, wherein acquiring the human eye pixel position of the human eye region on the visible light sensor comprises:
acquiring a visible light image by the visible light sensor;
when the visible light image comprises a human face region, determining a preliminary pixel position of the human eye region on the visible light sensor according to the human face region;
determining a human eye contour according to the preliminary pixel position; and
determining a pupil pixel position according to the human eye contour;
wherein performing the coordinate comparison between the target pixel position and the human eye pixel position to determine whether the human eye enters the zero-level region comprises:
performing a coordinate comparison between the target pixel position and the pupil pixel position to determine whether the pupil enters the zero-level region; and
wherein triggering the protection mechanism of the infrared emitter when the human eye enters the zero-level region comprises:
triggering the protection mechanism of the infrared emitter when the pupil enters the zero-level region.

7. The control method according to claim 6, wherein determining the human eye contour according to the preliminary pixel position comprises:
locating a left eye region and/or a right eye region in the preliminary pixel position by using a classifier;
performing a binarization process on the human face region; and
performing an edge detection on the left eye region and/or the right eye region to determine the human eye contour;
and
wherein determining the pupil pixel position according to the human eye contour comprises:
determining whether the human eye contour is in a predetermined shape;
converting the human eye contour into a set of points when the human eye contour is in the predetermined shape; and
fitting the set of points by a least square method to determine the pupil pixel position.

8. The control method according to claim 1, wherein triggering the protection mechanism of the infrared emitter when the human eye enters the zero-level region comprises:
reducing at least one selected from a current, a pulse width and a frame rate of the infrared emitter when the human eye enters the zero-level region; or
turning off the infrared emitter when the human eye enters the zero-level region.

9. The control method according to claim 1, wherein triggering the protection mechanism of the infrared emitter when the human eye enters the zero-level region comprises:
prompting a user when the human eye enters the zero-level region.

10. An electronic device, comprising an infrared emitter, an infrared sensor, a visible light sensor, and a processor, wherein the processor is configured to:
acquire an original pixel position of a zero-level region on the infrared sensor;

acquire a human eye pixel position of a human eye region on the visible light sensor;

determine whether a human eye enters the zero-level region according to the original pixel position and the human eye pixel position;

convert the original pixel position into a target pixel position of the zero-level region on the visible light sensor;

perform a coordinate comparison between the target pixel position and the human eye pixel position to determine whether the human eye enters the zero-level region; and trigger a protection mechanism of the infrared emitter when the human eye enters the zero-level region.

11. A non-transitory computer-readable storage medium containing computer-readable instructions that, when executed by a processor, causes the processor to perform the control method according to claim 1.

12. The electronic device according to claim 10, wherein the visible light sensor is configured to acquire a visible light image; and the processor is configured to acquire the human eye pixel position of the human eye region on the visible light sensor when the visible light image comprises the human eye region.

13. The electronic device according to claim 12, wherein the electronic device comprises a human eye model library stored with a human eye template image, and the processor is configured to:

read the visible light image and the human eye template image; and calculate a correlation between the visible light image and the human eye template image to determine whether the visible light image comprises the human eye region.

14. The electronic device according to claim 13, wherein the processor is configured to:

acquire a grayscale parameter of the visible light image and a grayscale parameter of the human eye template image;

traverse the visible light image according to the grayscale parameter of the human eye template image to obtain a matched region in the visible light image, wherein a grayscale parameter of the matched region matches the grayscale parameter of the human eye template image; and determine whether the visible light image comprises the human eye region according to the matched region.

15. The electronic device according to claim 14, wherein the processor is configured to:

mark the matched region in the visible light image;

acquire an edge pixel position of the matched region on the visible light sensor; and perform a coordinate comparison between the target pixel position and the edge pixel position to determine whether the human eye enters the zero-level region.

16. The electronic device according to claim 10, wherein the human eye comprises a pupil, wherein the visible light sensor is configured to acquire a visible light image; and the processor is configured to:

when the visible light image comprises a human face region, determine a preliminary pixel position of the human eye region on the visible light sensor according to the human face region;

determine a human eye contour according to the preliminary pixel position;

determine a pupil pixel position according to the human eye contour;

perform a coordinate comparison between the target pixel position and the pupil pixel position to determine whether the pupil enters the zero-level region; and trigger the protection mechanism of the infrared emitter when the pupil enters the zero-level region.

17. The electronic device according to claim 16, wherein the processor is configured to:

locate a left eye region and/or a right eye region in the preliminary pixel position by using a classifier;

perform a binarization process on the human face region;

perform an edge detection on the left eye region and/or the right eye region to determine the human eye contour;

determine whether the human eye contour is in a predetermined shape;

convert the human eye contour into a set of points when the human eye contour is in the predetermined shape; and fit the set of points by a least square method to determine the pupil pixel position.

18. The electronic device according to claim 10, wherein the processor is configured to:

reduce at least one selected from a current, a pulse width and a frame rate of the infrared emitter when the human eye enters the zero-level region, or turning off the infrared emitter when the human eye enters the zero-level region;

and/or prompt a user when the human eye enters the zero-level region.

* * * * *